United States Patent
Ganille et al.

(10) Patent No.: US 10,249,094 B2
(45) Date of Patent: Apr. 2, 2019

(54) METHOD OF SYNTHETIC REPRESENTATION OF ELEMENTS OF INTEREST IN A VIEWING SYSTEM FOR AIRCRAFT

(71) Applicant: THALES, Courbevoie (FR)

(72) Inventors: Thierry Ganille, Merignac (FR); Bruno Aymeric, St Medard en Jalles (FR); Johanna Lux, Le Haillan (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 15/469,555

(22) Filed: Mar. 26, 2017

(65) Prior Publication Data

US 2017/0287224 A1    Oct. 5, 2017

(30) Foreign Application Priority Data

Apr. 1, 2016    (FR) ..................... 16 00547

(51) Int. Cl.

| | |
|---|---|
| G06T 19/00 | (2011.01) |
| G01S 17/89 | (2006.01) |
| G02B 27/01 | (2006.01) |
| G06T 15/20 | (2011.01) |
| H04N 7/18 | (2006.01) |
| G01C 23/00 | (2006.01) |

(Continued)

(52) U.S. Cl.
CPC .......... *G06T 19/006* (2013.01); *G01C 23/005* (2013.01); *G01S 7/24* (2013.01); *G01S 13/89* (2013.01); *G01S 13/913* (2013.01); *G01S 13/94* (2013.01); *G01S 17/89* (2013.01); *G02B 27/01* (2013.01); *G02B 27/0101* (2013.01); *G06K 9/0063* (2013.01); *G06T 15/205* (2013.01); *G08G 5/0021* (2013.01); *G08G 5/0086* (2013.01); *G08G 5/025* (2013.01); *H04N 7/183* (2013.01); *B64D 45/08* (2013.01); *G02B 2027/014* (2013.01); *G02B 2027/0134* (2013.01); *G02B 2027/0138* (2013.01); *G06T 2215/16* (2013.01); *H04N 5/33* (2013.01)

(58) Field of Classification Search
USPC ......................................... 345/419
See application file for complete search history.

(56) References Cited

U.S. PATENT DOCUMENTS

| | | | |
|---|---|---|---|
| 7,826,666 B2 | 11/2010 | Hamza et al. | |
| 7,925,117 B2 | 4/2011 | Hamza et al. | |

(Continued)

*Primary Examiner* — Kimbinh T Nguyen
(74) *Attorney, Agent, or Firm* — Baker & Hostetler LLP

(57) ABSTRACT

A method of synthetic representation of elements of interest in a viewing system for aircraft, the viewing system comprises location sensors, a cartographic database and a database of elements of interest, an image sensor, a unit for processing images and a unit for generating three-dimensional digital images representative of the terrain overflown and a viewing device, wherein, when the terrain overflown comprises an element of interest, the method of synthetic representation comprises: a first step of searching for and detecting the element of interest in each image of a sequence of images, and; a second step of generating three-dimensional digital images representative of the terrain overflown, the element of interest represented according to a first representation if it has not been detected in any of the images of the sequence of images and according to a second representation if it is detected.

9 Claims, 4 Drawing Sheets

(51) Int. Cl.
  *G06K 9/00* (2006.01)
  *G08G 5/00* (2006.01)
  *G08G 5/02* (2006.01)
  *G01S 7/24* (2006.01)
  *G01S 13/89* (2006.01)
  *G01S 13/91* (2006.01)
  *G01S 13/94* (2006.01)
  *B64D 45/08* (2006.01)
  *H04N 5/33* (2006.01)

(56) References Cited

U.S. PATENT DOCUMENTS

| | | | |
|---|---|---|---|
| 8,917,191 B1 | 12/2014 | Tiana et al. | |
| 9,070,285 B1 | 6/2015 | Ramu et al. | |
| 9,174,746 B1* | 11/2015 | Bell | G01C 23/00 |
| 9,243,910 B1 | 1/2016 | Esno et al. | |
| 9,489,575 B1* | 11/2016 | Whalen | G01S 13/94 |
| 9,715,016 B2* | 7/2017 | Allen | G01S 17/89 |
| 9,733,349 B1* | 8/2017 | Wood | G01S 13/953 |
| 2013/0215148 A1* | 8/2013 | Antonyuk | G06T 19/006 |
| | | | 345/633 |
| 2013/0231705 A1* | 9/2013 | Zalenski | A61B 17/7071 |
| | | | 606/279 |
| 2013/0300587 A1* | 11/2013 | Wyatt | G01C 23/00 |
| | | | 340/972 |
| 2014/0097973 A1* | 4/2014 | Baudson | G06T 19/006 |
| | | | 340/972 |
| 2014/0285661 A1* | 9/2014 | Feyereisen | G08B 13/196 |
| | | | 348/148 |
| 2015/0262493 A1* | 9/2015 | Jensen | G08G 5/065 |
| | | | 701/3 |
| 2017/0030735 A1* | 2/2017 | Mohideen | G08G 5/0021 |
| 2017/0214904 A1* | 7/2017 | Wyatt | H04N 13/302 |

* cited by examiner

METHOD OF SYNTHETIC REPRESENTATION OF ELEMENTS OF INTEREST IN A VIEWING SYSTEM FOR AIRCRAFT

CROSS-REFERENCE TO RELATED APPLICATIONS

This application claims priority to foreign French patent application No. FR 1600547, filed on Apr. 1, 2016, the disclosure of which is incorporated by reference in its entirety.

FIELD OF THE INVENTION

The field of the invention is that of viewing systems which combine a synthetic image constructed with the help of a database with one or more images originating from one or more sensors. These systems are known by the term "CVS", the acronym standing for "Combined Vision Systems". They are dedicated to the driving of vehicles and especially of aircraft. They allow the operators of the vehicle to conduct their mission in bad weather with the same rules and the same safety as in good weather. For example, in aeronautical use, they are especially used during the rolling, takeoff and landing phases.

BACKGROUND

The sensors implemented are infrared sensors, millimetric radars or lidars. The images may be displayed on viewing devices situated on the instrument panel or else on transparent viewing devices displaying the images overlaid on the exterior landscape.

To allow the pilot to locate themself properly, it is sought to detect and to display easily recognizable and identifiable objects. In the subsequent description, these objects are called "elements of interest". It is understood that these elements of interest must be displayed in the clearest and most intuitive possible manner.

In the case of aeronautical applications, these objects are landing runways in particular. During an instrument-based approach, regulations require the crew to acquire exterior visual references above a certain altitude or at a certain height from the runway so as to be able to continue the landing, otherwise the crew performs a go-around. Starting a few years ago, a specific regulation permits the crew to acquire the visual references by way of a forward-looking sensor of the aircraft rather than by direct vision. It is therefore essential that the presentation of the information arising from the sensors be presented in the best possible manner so as to aid the crew in its decision-making.

A first solution consists in displaying solely the synthetic image in a so-called "SVS" system, the acronym standing for "Synthetic Vision System", without taking into account the information arising from the image sensors. Thus, in aeronautical use, the system displays solely the terrain and the landing runways on the basis of the position of the aircraft provided by its "GPS" system and its inertial platform. The uncertainty in the position of the aeroplane as well as the precision of the positions of the runways stored in the databases prohibit, however, the use of an SVS in critical phases where the aircraft is close to the ground, such as landing and takeoff.

A second solution consists in displaying solely the image arising from the sensor or sensors. These systems are called "EVS", the acronym standing for "Enhanced Vision Systems" or "EFVS", the acronym standing for "Enhanced Flight Vision Systems". However, the elements of interest are not necessarily easily identifiable. Thus, it is difficult to detect a landing runway with an infrared detector in certain meteorological conditions, such as in foggy weather, for example. The information necessary for landing is then not at the disposal of the crew.

Finally, the existing CVS solutions are based on the simultaneous display of all or part of the synthetic image and of the image arising from the sensor, for example by overlaying the various images and optionally registering the synthetic image on a notable element of the sensor image, or else by inlaying the sensor image in an inset of the synthetic image or else by cropping notable elements of the sensor image and inlaying these elements on the synthetic image. By way of examples, U.S. Pat. No. 7,826,666 entitled "Methods and apparatus for runway segmentation using sensor analysis" and U.S. Pat. No. 7,925,117 entitled "Fusion of sensor data and synthetic data to form an integrated image" describe solutions of this type.

The main defects of these CVS solutions reside in their difficulty of readability and of interpretation by the crew. Another defect is their dependency on the frequency of generation of the images of the sensors which for some sensors, of the radar family for example, may introduce jerkiness into the display of the image. The sensors of infrared type exhibit other drawbacks as already mentioned.

Finally, the "APALS" system, the acronym standing for "Autonomous Precision Approach and Landing System", proposes a synthetic representation of the landing runway constructed on the basis of navigation data and of detection by a modified weather radar. This system does not make it possible to know whether the runway is actually detected by the radar and does not propose any transition between the synthetic representation of the runway before detection and after detection by the sensor.

SUMMARY OF THE INVENTION

The method of synthetic representation of elements of interest according to the invention does not exhibit the previous drawbacks. The core of this method is to display solely the synthetic image but in a configuration and in a representation dependent on the recognition of elements of interest by the sensors. One thus benefits from the information given by the sensors without having the drawbacks of a sensor image which may be of poor quality.

More precisely, the subject of the invention is a method of synthetic representation of elements of interest in a viewing system for aircraft, the said viewing system comprising at least sensors of location of the said aircraft, a first cartographic database, a second database of elements of interest, an image sensor, a unit for processing the images arising from the said image sensor, a unit for generating three-dimensional digital images representative of the terrain overflown by the aircraft as a function of the data arising from the location sensors, from the cartographic database and the database of elements of interest and from the image processing unit and a viewing device, characterized in that, when the terrain overflown comprises at least one element of interest present in the database of elements of interest, the said element being displayed in the three-dimensional digital images representative of the terrain overflown, the said method of synthetic representation comprises at least:

a first step of searching for and detecting the said element of interest in each image of a sequence of images arising from the image sensor, the detection being ensured by the processing unit and;

a second step of generating three-dimensional digital images representative of the terrain overflown, the element of interest being represented according to a first representation if it has not been detected in any of the images of the sequence of images arising from the image sensor and according to a second representation if it is detected in at least one image of the sequence of images.

Advantageously, in the second step, the element of interest being represented in the second representation is represented according to a third representation if it is no longer detected in a determined succession of images of the said sequence of images.

Advantageously, when the element of interest is detected in at least one image of the sequence of images, the position of this element of interest in the three-dimensional digital image is made to agree with the position that it occupies in the said image arising from the image sensor.

Advantageously, when the element of interest is detected in at least one image of the sequence of images, the position of the three-dimensional digital image is made to agree with the position of the said image arising from the image sensor.

Advantageously, the first representation, the second representation and the third representation differ from one another by the colours of their contours or the line styles of their contours or by the appearance, the disappearance or the modification of symbols associated with the said element of interest.

Advantageously, the element of interest is a landing runway or elements of a landing runway or a helipad or else a fixed obstacle.

Advantageously, the image sensor is an infrared camera, a millimetric radar or a "LADAR".

Advantageously, the viewing system is one of the colour screens of the instrument panel of the aircraft or a display of head-up type displaying the three-dimensional image on the exterior landscape or a helmet viewing system or a device for display and projection on the windscreen of the aircraft.

BRIEF DESCRIPTION OF THE DRAWINGS

The invention will be better understood and other advantages will become apparent on reading the nonlimiting description which follows and by virtue of the appended figures among which.

DETAILED DESCRIPTION

Figure 1:
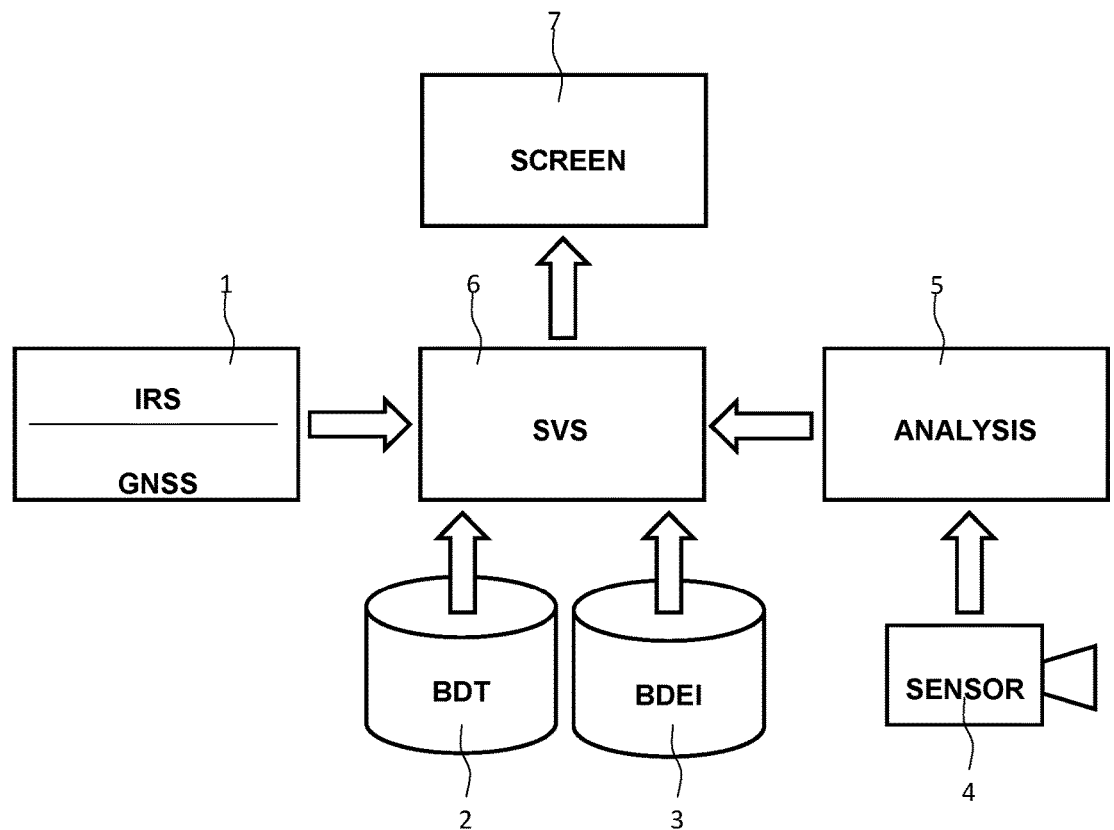
FIG. 1 represents a viewing system implementing a method of synthetic representation of elements of interest according to the invention.

By way of nonlimiting example, FIG. 1 represents a viewing system implementing a method of synthetic representation of elements of interest according to the invention within the framework of an aeronautical application. This viewing system comprises at least:

sensors 1 of location of the said aircraft;
a first cartographic database 2;
a second database of elements of interest 3;
one or more image sensors 4;
a unit 5 for processing the images arising from the said image sensor;
a unit for generating three-dimensional digital images 6 representative of the terrain overflown by the aircraft as a function of the data arising from the location sensors, from the cartographic database and the database of elements of interest and from the image processing unit and a viewing device. This unit is also called an SVS unit;
a viewing device 7.

The location sensors 1 generally comprise a satellite navigation system termed "GPS", the acronym standing for "Global Positioning System", or "GNSS", the acronym standing for "Global Navigation Satellite System", and a so-called "IRS" inertial platform, the acronym standing for "Inertial Reference System", the whole making it possible to determine the position of the aircraft in a terrestrial frame and its attitude in this frame.

The database of elements of interest 3 can be the navigation base of the navigation system of the craft, known by the acronym "FMS" standing for "Flight Management System" or else the obstacle base of the "TAWS" system, standing for "Terrain Awareness and Warning System". An element of interest of this base can be a landing runway, a helipad or else a fixed obstacle. The position of a mobile obstacle cannot come from a database. On the other hand, it can be provided by the "ADS-B" system, the acronym standing for "Automatic Dependent Surveillance-Broadcast".

The image sensors 4 can be an infrared camera, a millimetric radar or else an active laser of "LADAR" type, the acronym standing for "LAser Detection And Ranging". The sensors are necessarily disposed so as to look forward from the aircraft.

The essential function of the unit 5 for processing the images arising from the said image sensor 4 is to tag the elements of interest present in the image. This analysis is facilitated by the approximate knowledge of the elements of interest which ought to be present in the image, having regard to the position of the aircraft with respect to the terrain. Moreover, the shape of the elements of interest is also known.

The SVS unit 6 generates the three-dimensional digital images on the basis of the information arising from the location sensors, from the cartographic database and the database of elements of interest and from the image processing unit. It implements more specifically the method of synthetic representation of elements of interest according to the invention.

The viewing device may be of various kinds. It may be one of the colour screens of the instrument panel of the aircraft or a display of head-up type displaying the three-dimensional image on the exterior landscape or else a helmet viewing system or a display on the windscreen of the craft.

Figure 2:
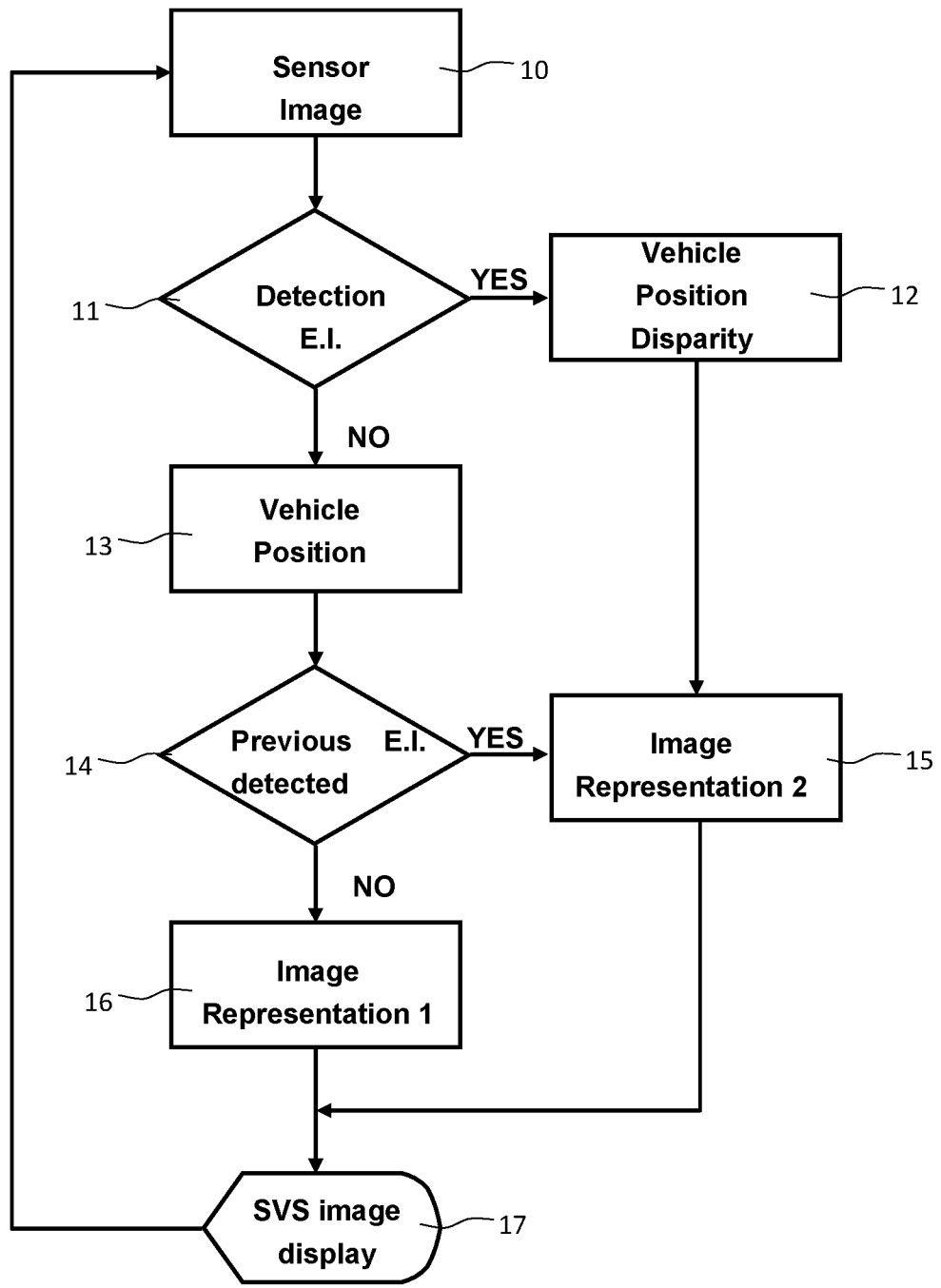
FIG. 2 represents the functional chart representing the method according to the invention.

The method according to the invention is implemented in a sequence of images which can comprise a few images to a few tens of images. This sequence is, of course, renewable. By way of nonlimiting example, the simplified flowchart of the method according to the invention and implemented by the unit 6 is represented in FIG. 2.

In an initial step represented under the reference 10, the image sensor records an image of the sequence and transmits it to the processing unit 6.

In a first step comprising the references 11, 12, 13 and 14, the processing unit searches this image for an element of interest E.I. contained in the databases and liable to be present in the image. This search is symbolized by the lozenge 12.

Two typical cases arise. The search does not find any element of interest. This case is symbolized by the "NO" arrow issuing from the lozenge 11 of FIG. 2. The calculation unit takes into account the position of the aircraft symbolized by the rectangle 13. Next, the calculation unit verifies whether, in the previous images, an element of interest has been detected. This step is symbolized by the lozenge 14.

If no element of interest has been detected in the previous images, this case being symbolized by the "NO" arrow issuing from the lozenge 14 of FIG. 2, the three-dimensional synthetic image is constructed as a function of the aircraft positioning information given by the location means such as the GPS or GNSS systems, optionally augmented by satellite, these systems being known by the term "SBAS" standing for "Satellite-Based Augmentation Systems", or the IRS inertial platform or else by a hybrid system grouping together the information arising from the inertial platform and from the satellite navigation systems. These hybrid systems have a margin of errors on each axis of 30 meters with a probability of $10^{-7}$.

If an element of interest is nevertheless present in the synthetic image of the exterior landscape, it is then generated in the form of a first representation as indicated in the rectangle 16 of FIG. 2. The pilot then understands that this element of interest must exist on the terrain but has not been detected by the image sensors.

If the search finds an element of interest or if an element of interest has been detected previously, these cases are symbolized by the "YES" arrows issuing from the lozenges 11 and 14 of FIG. 2. An algorithm then calculates the position of the aircraft with respect to this element of interest in the relevant axes. This calculated position is thereafter used to frame the displayed synthetic image. This framing or this registration takes into account possible disparities between the position of the aircraft arising from its navigation system and the position calculated on the basis of the position of the detected element.

Two options are possible. In a first option, the registration relates only to the element of interest. The remainder of the synthetic image is displayed without registration. In a second option, the entire synthetic image is registered. In all typical cases, the element or elements of interest are displayed according to a second representation different from the first representation, thus telling the users that the displayed element or elements of interest have been detected by the sensors of the craft and are indeed present in the image.

It is possible to refine the method according to the invention. When the element of interest has been detected in one or more images and then is no longer detected over a plurality of successive images, for example if the aircraft momentarily passes through a thicker bank of fog impairing the reception of the sensors, then the element of interest is displayed in the form of a third representation, different from the previous two.

The first representation, the second representation and the third representation can differ from one another by the colours of their contours or by the line styles of their contours or else by the appearance, the disappearance or the modification of symbols associated with the said element of interest.

By way of exemplary application, the method according to the invention is implemented to ensure aircraft takeoff and/or landing in conditions of degraded visibility. The elements of interest are then the landing runways whose information necessary for their synthetic display can be provided by the ARINC 424 standard navigation database, a regularly updated database customarily present in modern aircraft.

The analysis module then contains, more specifically, algorithms for detecting the landing runways and their approach ramp in the images provided by the craft's image sensors.

When a runway and/or its ramp is detected, this module calculates the position of the aircraft in the runway frame, that is to say the "HAT" height with respect to the runway, HAT standing for "Height Above Threshold", the lateral disparity with respect to the runway axis and optionally the horizontal distance to the threshold. The position error in the longitudinal axis of the runway is much less critical than the two previously cited disparities.

These two or optionally three values are dispatched to the SVS module of the craft which compares them with the values calculated on the basis of the aeroplane's assumed position provided by the inertial platform and of the position of the landing runway or runways which arise from the databases of elements of interest. It is, indeed, possible for several parallel runways to exist in one and the same airport. If the two or three absolute values of the differences are less than a predetermined threshold, an association is made between the runway detected by the sensor and the runway arising from the database of elements of interest. This predetermined threshold is dependent on the possible error of the inertial platform, on the possible error of the sensor and on the possible error of position of the runway threshold in the database, the threshold for the vertical axis possibly being different from the threshold used for the axes of the plane of the runway. It is also possible to verify that one is indeed dealing with the runway identified for the landing in the aircraft's flight management system or FMS.

An angular disparity between the axis of the runway given by the database and the runway axis detected by a sensor can be identified if the precision of the value of the heading of the runway recorded in the navigation base is not sufficient, or else expressed according to a magnetic heading, which may undergo variations over time instead of the true heading. This disparity in the orientation of the runway axis, if it exists, is also stored and compensated in the plot of the synthetic runway.

The disparities in these three axes are then used to register and store a new origin of the plot of the runway in the synthetic image of the terrain. If a disparity in the vertical axis is identified, it is also possible to perform a vertical registration of the plot of the terrain. If the detection of the runway by the sensor is interrupted, the plot of the runway continues to be performed with the last calculated origin and the position provided by the IRS platform, thus allowing the landing to be continued with a synthetic runway calculated on the basis of its last registered position.

A second approach consists in calculating and storing a disparity in the longitude, latitude and altitude data originating from the IRS platform allowing runway display consistent with the data arising from the sensor instead of the calculation of the new origin of the runway.

The runway is then represented in its second representation, indicating to the pilot that the runway is indeed just where it is displayed.

The two representations of the landing runways can be differentiated, for example, by the colour of their contour. For a "head-down" instrument panel display, the contour of the runway can be represented in amber or in red when the runway is not detected and in green when the runway is detected.

These representations can vary by the line style of the contour. For a head-up monochrome display, the lines representing the runway are dashed when the runway is not detected and these lines are represented as solid lines when the runway is detected.

It is also possible to use symbolic representations of the lamps of the runway threshold. For example, the lamps are represented in the form of empty circles or with amber crosses when the runway is not detected and the runway lamps are represented in the form of white or green solid circles when the runway is detected.

Figure 3:
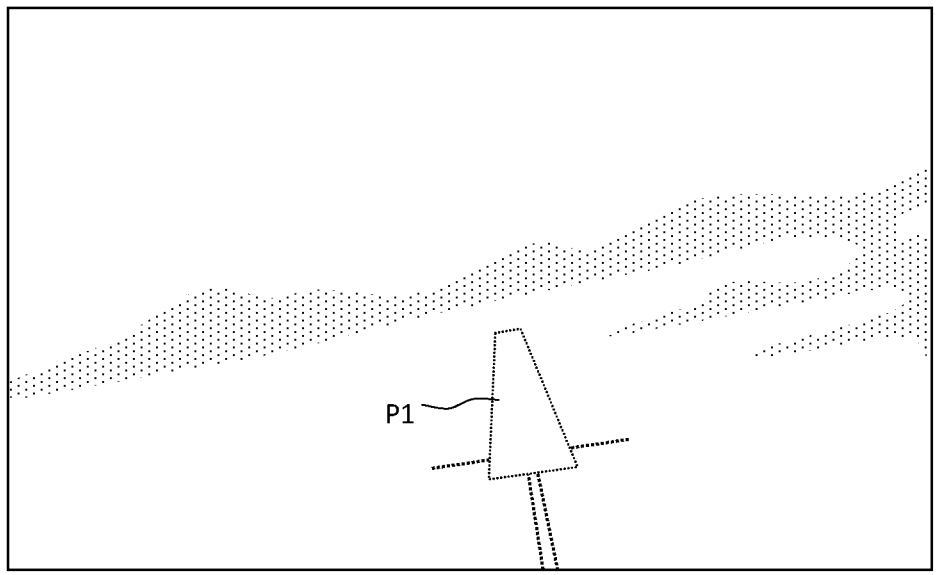
FIGS. 3, 4 and 5 represent an exemplary implementation of the method according to the invention in a viewing device.
Figure 4:
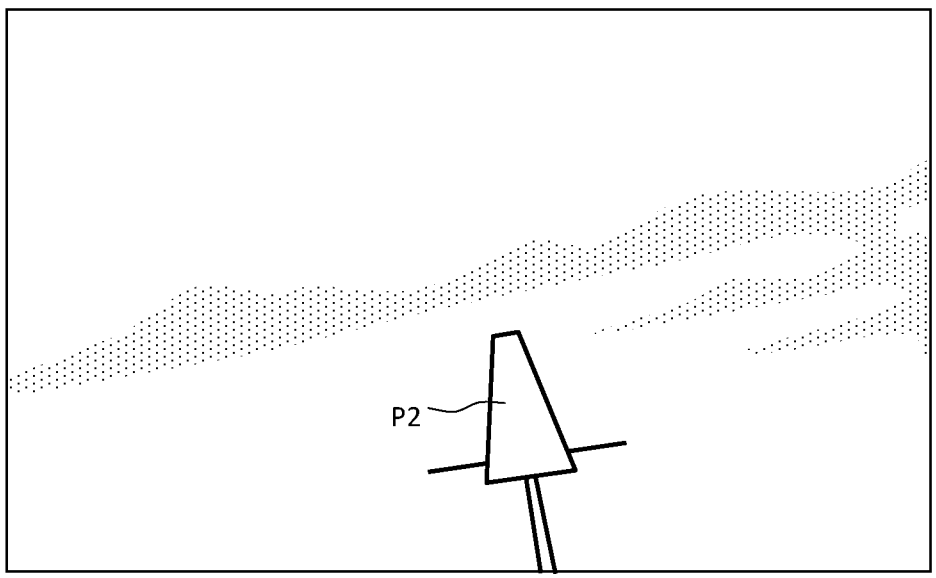
Figure 5:
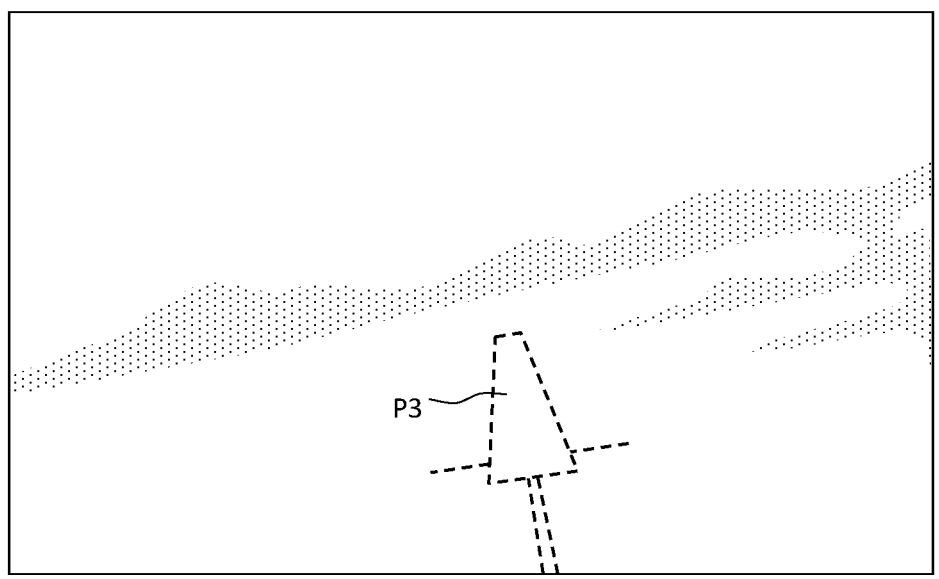

FIGS. 3 to 5 illustrate, in the case where the element of interest is a landing runway P, the three possible representations of this runway in a Head-Up viewing device. In the case of FIG. 3, the runway has not been detected and is represented as a first representation P1 comprising tightly spaced dashes. In the case of FIG. 4, the runway has been detected and is represented as a second representation P2 comprising continuous lines. In the case of FIG. 5, the runway has been detected at least once and then is no longer detected over a succession of images. It is represented as a third representation P3 comprising wide dashes.

The great advantage of the method according to the invention is that it uses the useful items of information arising from the image sensors of the craft without having to manage them or to display them. The pilot thus has the item of information that the elements of interest are indeed present outside just where the three-dimensional synthetic image displays them without having the drawbacks of a real image which would not necessarily be easily exploitable.

The invention claimed is:

1. A method of synthetic representation of elements of interest in a viewing system for aircraft, the said viewing system comprising at least sensors of location of the said aircraft, a first cartographic database, a second database of elements of interest, an image sensor, a processing unit for the images arising from the said image sensor, a unit for generating three-dimensional digital images representative of the terrain overflown by the aircraft as a function of the data arising from the location sensors, from the cartographic database and the database of elements of interest and from the image processing unit and a viewing device, wherein
when the terrain overflown comprises at least one element of interest present in the database of elements of interest, the said element being displayed in the three-dimensional digital images representative of the terrain overflown, the said method of synthetic representation comprises at least:
a first step of searching for and detecting the said element of interest in each image of a sequence of images arising from the image sensor, the detection being ensured by the processing unit and;
a second step of generating three-dimensional digital images representative of the terrain overflown, the element of interest being represented according to a first apparent representation if it has not been detected in any of the images of the sequence of images arising from the image sensor and according to a second apparent representation if it is detected in at least one image of the sequence of images.

2. The method of synthetic representation of elements of interest according to claim 1, wherein, in the second step, the element of interest being represented in the second representation is represented according to a third representation if it is no longer detected in a determined succession of images of the said sequence of images.

3. The method of synthetic representation of elements of interest according to claim 1, wherein, when the element of interest is detected in at least one image of the sequence of images, the position of this element of interest in the three-dimensional digital image is made to agree with the position that it occupies in the said image arising from the image sensor.

4. The method of synthetic representation of elements of interest according to claim 1, wherein, when the element of interest is detected in at least one image of the sequence of images, the position of the three-dimensional digital image is made to agree with the position of the said image arising from the image sensor.

5. The method of synthetic representation of elements of interest according to claim 1, wherein the first representation, the second representation and the third representation of an element of interest differ from one another by the colours of their contours or by the line styles of their contours or by the appearance, the disappearance or the modification of symbols associated with the said element of interest.

6. The method of synthetic representation of elements of interest according to claim 1, wherein the element of interest is a landing runway or elements of a landing runway or a helipad.

7. The method of synthetic representation of elements of interest according to claim 1, wherein the element of interest is a fixed obstacle.

8. The method of synthetic representation of elements of interest according to claim 1, wherein the image sensor is a millimetric radar or a "LADAR" or an infrared camera.

9. The method of synthetic representation of elements of interest according to claim 1, wherein the viewing system is one of the colour screens of the instrument panel of the aircraft or a display of head-up type displaying the three-dimensional image on the exterior landscape or a helmet viewing system or a device for display and projection on the windscreen of the aircraft.

* * * * *